W. Strevell,
Stretching Leather.
N° 59,292.    Patented Oct. 30, 1866.
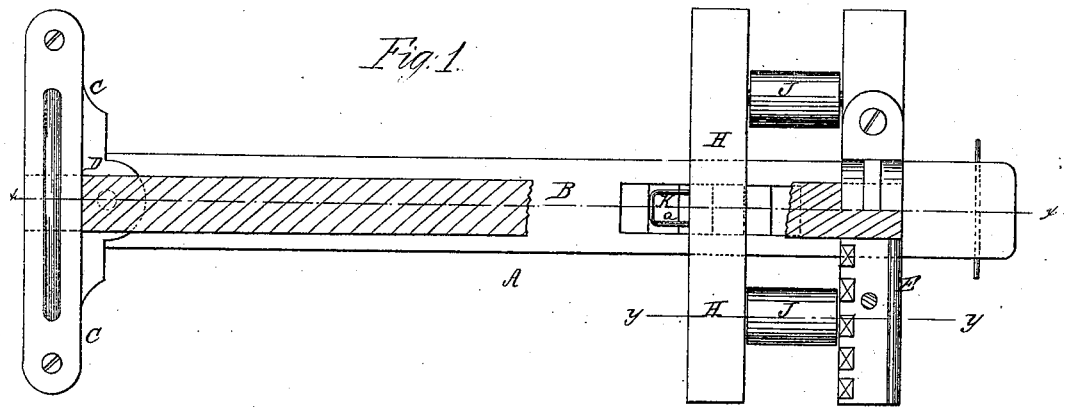
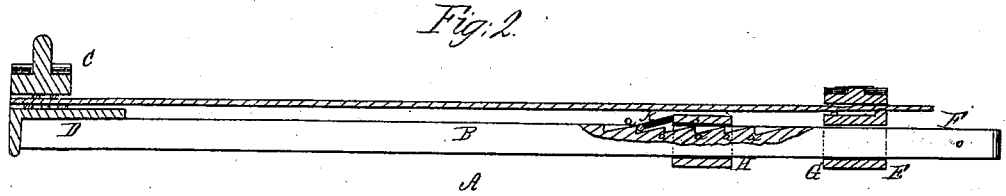
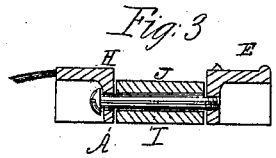
Witnesses:
Theo Tusch
F. A. Jackson
Inventor
W. Strevell
Per Munn &
Attorneys

UNITED STATES PATENT OFFICE.

W. STREVELL, OF JERSEY CITY, NEW JERSEY.

IMPROVED DEVICE FOR STRETCHING LEATHER.

Specification forming part of Letters Patent No. 59,292, dated October 30, 1866.

*To all whom it may concern:*

Be it known that I, W. STREVELL, of Jersey City, in the county of Hudson and State of New Jersey, have invented a new and useful Improvement in Machines for Stretching Leather; and I do hereby declare that the following is a full, clear, and exact description thereof, which will enable others skilled in the art to make and use the same, reference being had to the accompanying drawings, forming part of this specification.

The present invention relates to a machine or apparatus more especially designed to be used in the manufacture of leather machine belting or banding, although it can be employed to advantage in stretching leather to be used for other purposes; and it consists in so constructing the machine or apparatus that an easy strain can be produced upon the leather while the power is being applied to stretch it; that the taking up of the slack in the leather as it dries can be secured, as well as to accommodate it to the natural tension of the leather, owing to the fact that the fibers of one portion of the leather are closer than another, which is natural to sides, and also more or less to other portions of the hides.

In the accompanying plate of drawings, my improvement in machines for stretching leather is illustrated, Figure 1 being a plan or top view of the machine, with a portion broken away; Fig. 2, a central vertical section taken in the plane of the line $x\,x$, Fig. 1, and in the direction of the length of the machine; and Fig. 3, a vertical section taken in the plane of the line $y\,y$, Fig. 1.

Similar letters of reference indicate like parts.

A in the drawings represents my improved machine for stretching leather, which consists, principally, of a bar, B, extending in the direction of its length, with stationary jaws C at one end, D, between which one end of the strip or band of leather which is to be stretched is secured or clamped, the other end being secured or clamped between similar jaws E, at the other or opposite end, F, of the bar B, arranged to move or slide upon the said bar by its collar or sleeve G, surrounding the same.

H, a cross-bar, also arranged to slide or move upon the longitudinal bar B, on which it is placed between its stationary and movable jaws or clamps, it being attached to the latter by connecting-rods I, so as to move upon the same, each of which rods is surrounded or has placed upon it a rubber or other suitable elastic cushion or spring, J. To this sliding cross-bar H a pawl, K, is hung or secured, to engage with the teeth $a$ made in the upper side of the bar B of the stretching-frame.

In the use of the machine above explained for the stretching of leather bands, strips, or belts, the leather is first secured at one end between the stationary jaws or clamps C when passing the said band along to the other jaws or clamps, E. It is then secured between them, and is in position for being stretched, to accomplish which power is then brought to bear upon the movable jaws E or cross-bar H in the proper direction to draw or stretch the leather, the cross-bar H moving in conjunction with the sliding jaws, and by the pawl K engaging with the teeth $a$ of the bar, holding the sliding jaws to whatever point they may be drawn or pulled, when, having drawn the leather to the desired degree of tension, it is there allowed to remain or stand until it has become sufficiently dry, after which it is removed from the machine and a new band inserted or placed therein, as before, and so on.

From the above description of the manner in which my improved machine is constructed and its use, it is plain to be understood that by the rubber cushions or springs J not only is an easy strain produced upon the leather being stretched, but as the leather slackens from becoming dry such slack is immediately taken up by the action of such springs or cushions, and consequently the tension upon the leather thereby maintained; and, furthermore, the machine can adapt itself to any inequalities which there may be in the leather—that is, if its fibers are closer upon one side than the other—the cross-bar for this purpose being made sufficiently loose upon the bar B to allow it to tilt or swing upon the same.

I claim as new and desire to secure by Letters Patent—

The combination, with the sliding jaws or clamps E, of the cross-bar H, connected therewith by rods I, having rubber or other elastic cushions or springs, J, substantially as and for the purpose described.

WM. STREVELL.

Witnesses:
ALBERT W. BROWN,
ALEX. F. ROBERTS.